No. 736,697. PATENTED AUG. 18, 1903.
E. M. CUMMINS.
WHEELBARROW.
APPLICATION FILED JUNE 26, 1903.
NO MODEL.
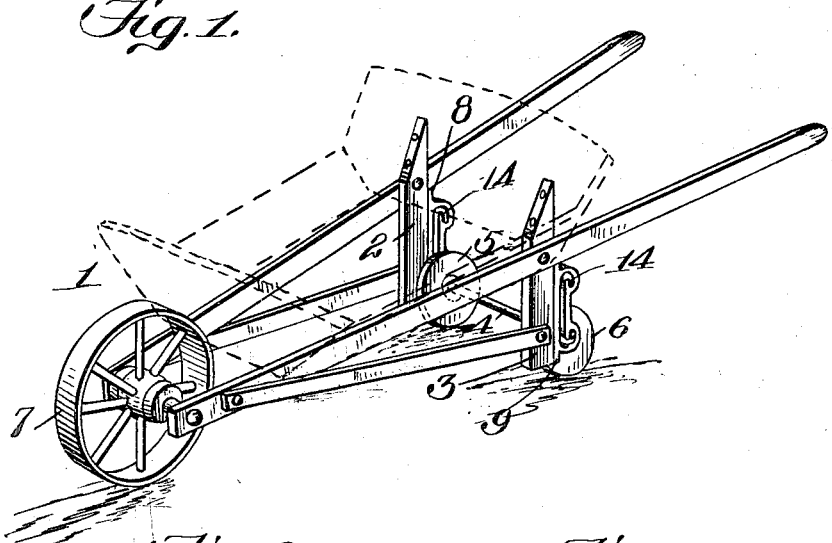
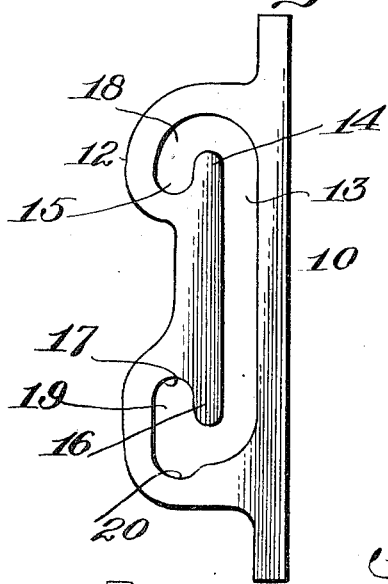
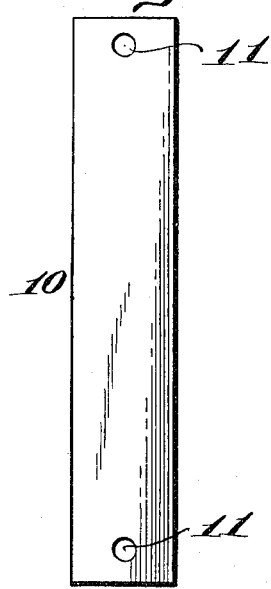
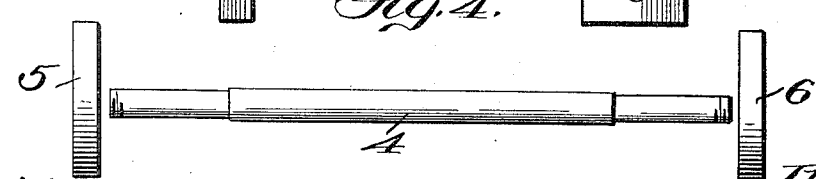
Witnesses
C. W. Kesler
James L. Norris Jr.
Inventor
Edwin M. Cummins
By James L. Norris
Atty.

No. 736,697. Patented August 18, 1903.

UNITED STATES PATENT OFFICE.

EDWIN M. CUMMINS, OF SIOUX CITY, IOWA.

WHEELBARROW.

SPECIFICATION forming part of Letters Patent No. 736,697, dated August 18, 1903.

Application filed June 26, 1903. Serial No. 163,244. (No model.)

*To all whom it may concern:*

Be it known that I, EDWIN M. CUMMINS, a citizen of the United States, residing at Sioux City, in the county of Woodbury and State of Iowa, have invented new and useful Improvements in Wheelbarrows, of which the following is a specification.

This invention relates to certain new and useful attachments for wheelbarrows, trucks, or the like and which when secured in position will permit of the passing of a loaded wheelbarrow, truck, or the like over or onto any ordinary obstacle, such as a step, curbstone, &c.

A further object of the invention is to provide an attachment for wheelbarrows, trucks, or the like which when secured in position to the wheelbarrow, truck, or the like will permit of easily swinging or turning around in a small space of a loaded wheelbarrow, truck, or the like without lifting the same.

A further object of the invention is to provide an attachment for wheelbarrows, trucks, or the like which when in position, or rather secured in position to the wheelbarrow, truck, or the like, will enable a wheelbarrow, truck, or the like to be quickly converted into a three-wheel vehicle.

The invention further aims to construct an attachment for wheelbarrows, trucks, or the like for obtaining the foregoing objects which shall be extremely simple in its construction, strong, durable, efficient in its use, readily set up or attached in position, and comparatively inexpensive to manufacture.

With the foregoing and other objects in view the invention consists of the novel combination and arrangement of parts hereinafter more specifically described, and illustrated in the accompanying drawings, and particularly pointed out in the claims hereunto appended.

In describing the invention in detail reference is had to the accompanying drawings, forming a part of this specification, wherein like reference characters denote corresponding parts throughout the several views, and in which—

Figure 1 is an elevation of a wheelbarrow, showing my improved attachment secured thereto and in its operative position. Fig. 2 is a side elevation of one of the bearing-brackets forming a part of the attachment. Fig. 3 is a rear elevation thereof, and Fig. 4 is a disassembled view of the supporting-wheels and their shaft which form a part of my improved attachment for wheelbarrows.

To more fully illustrate the attachment in its position when set up, the attachment is shown, for example, in Fig. 1 as secured to the legs of a wheelbarrow, the wheelbarrow being indicated by the reference character 1 and the legs thereof by the reference characters 2 3.

The attachment consists of a pair of bearing-brackets, a pair of supporting-wheels, and a shaft for the wheels, the shaft being indicated by the reference character 4 and the supporting-wheels by the reference characters 5 6. The shaft 4 may be constructed of any suitable material, and the diameter of the wheels 5 6 is smaller than that of the wheel 7 of the wheelbarrow; but any preferred diameter of the supporting-wheels may be employed. The length of the shaft 4 is such as to project from one side of each of the brackets—that is, when the latter are secured in position—and the projecting ends of the shaft 4 are adapted to have the supporting-wheels 5 6 mounted thereon or secured thereto in any suitable manner. The wheels 5 6 are secured to the shaft 4, so that they can be readily removed, which is necessary if it is desired to replace one of the bearing-brackets or when separating the entire attachment.

The bearing-brackets are indicated by the reference characters 8 9, and each of the brackets consists of a supporting-plate substantially rectangular in contour, as at 10, and each of the said plates 10 is provided near its top and bottom with an opening 11. The outer face of each of the plates 11 has formed integral therewith a combined suspension and bearing arm 12, the latter extending at right angles to the outer face of the plate 10. The arm 12 is provided with a substantially C-shaped opening 13, forming thereby the top of the arm 12 with a retaining-lug 14 and a seat 15 for the shaft, and the bottom of the arm 12, with a retaining-lug 16, a bearing-surface 17, and a depression 20, forming also a seat for the shaft.

The lug 14 and the seat 15 are substantially in vertical alinement, respectively, with the lug 16 and the bearing-surface 17, and the depression 20 is substantially in alinement with the seat 15 and the bearing-surface 17.

The seat 15 is adapted to suspend the shaft 4 and wheels 5 6 in their inoperative position. The surface 17 is adapted to form a bearing for the shaft 4 when the shaft 4 and wheels 5 6 are moved to their operative position, and the depression 20 is adapted to receive the shaft when it is at rest in the lower portion of the arm 12. The lug 14 is adapted to retain the shaft 4 and wheels 5 6 in their inoperative position, and the lug 16 is adapted to retain the shaft 4 and wheels 5 6 in their operative position.

The substantially C-shaped opening 13 has its major portion extending in a vertical manner, so that when the shaft 4 is elevated out of the pocket 18 it will fall rapidly downward to the lower part of the C-shaped opening into the depression 20, and the weight of the loaded wheelbarrow, truck, or the like will cause the shaft 4 to be moved from said depression 20 up into the pocket 19 and engage the bearing-surface 17.

The attachment is secured in position to the legs of the wheelbarrow, truck, or the like in the following manner: The bearing-bracket 8 is placed against one of the legs of the wheelbarrow, and suitable holdfast devices pass through the openings 11, securing the plate to the leg in a manner as indicated in Fig. 1. The wheel 5 is mounted upon the shaft 4, so that the latter will project a suitable distance from the wheel, and this projecting end of the shaft is inserted through the C-shaped opening of the bracket 8. The wheel 6 is then mounted in a like manner on the other end of the shaft and also the bracket 9. The latter is then secured to the other leg of the wheelbarrow, the shaft 4 seating itself in the depression 20. It will be evident that instead of arranging the wheels 5 6 between the legs of the wheelbarrow the shaft 4 can extend from each side of the brackets 8 9 and the wheels 5 6, mounted on the said projecting ends.

If it is not necessary to use the supporting-wheels 5 6, the operator elevates the shaft 4, carrying the wheels 5 6 therewith, and moves the shaft 4 into the pocket 18, and it will then rest upon the seat 15, and the shaft 4 and wheels 5 6 will be suspended in an elevated position by the arm 12.

If the operator desires to move the shaft 4 and wheels 5 6 to their operative position, the shaft 4 is elevated out of the pocket 18 by the toe of the operator and the shaft 4 and wheels 5 6 will fall to the bottom of the C-shaped opening into the depression 20 and owing to the weight of the wheelbarrow or truck the shaft will be caused to move therefrom into the pocket 19 and engage the bearing-surface 17. The shaft 4 and wheels 5 6 will then be in their operative position. The wheelbarrow or truck can then be moved with its load over or onto any ordinary obstacle—such as a step, curbstone, &c.—or the wheelbarrow can be turned or swung around in a small space without lifting it, and it will be evident that when the shaft 4 and wheels 5 6 are brought to their operative position the wheelbarrow or truck will be converted into a three-wheeled vehicle.

It is thought the many advantages of my new and improved attachment for wheelbarrows, trucks, or the like can be readily understood from the foregoing description, taken in connection with the accompanying drawings, and it will furthermore be evident that changes, variations, and modifications can be resorted to without departing from the spirit of the invention or sacrificing any of its advantages, and I therefore do not wish to restrict myself to the details of construction hereinbefore described and as shown in the accompanying drawings, but reserve the right to make such changes, variations, and modifications as come properly within the scope of the protection prayed.

Having thus fully described my invention, what I claim as new, and desire to secure by Letters Patent, is—

1. An attachment for wheelbarrows, trucks or the like comprising a bearing-bracket consisting of a supporting-plate and a suspension and bearing arm, said arm provided with a substantially C-shaped opening forming thereby a pair of pockets, a pair of retaining-lugs, a seat and a bearing-surface.

2. An attachment for wheelbarrows, trucks or the like comprising a bearing-bracket consisting of a supporting-plate and a suspension and bearing arm, said arm provided with a substantially C-shaped opening forming thereby a pair of pockets, a pair of retaining-lugs, a seat and a bearing-surface, said pockets being substantially in vertical alinement.

3. An attachment for wheelbarrows, trucks or the like, comprising a pair of stationary bearing-brackets each of which is provided with a combined suspension and bearing arm and a supporting-plate integral with the said arm, a vertically-adjustable shaft extending through the said arms, and wheels mounted on the said shaft, said shaft when in its elevated position adapted to be suspended by said arm, and said arm acting as a bearing for said shaft when the latter is in its lowered position.

4. An attachment for wheelbarrows, trucks or the like, consisting of a pair of bearing-brackets each of which is formed with a supporting-plate and a suspension and bearing arm integral with said plate, said arm provided with a substantially C-shaped recess forming thereby a pocket at the upper and lower end of said arm, a vertically-adjustable shaft extending through the said openings, and wheels mounted on said shaft, said shaft when moved to the upper of said pockets adapted to be suspended by the said arm, and said arm adapted to form a bearing for the said shaft when the latter is moved into the lower of said pockets.

5. An attachment for wheelbarrows, trucks or the like, consisting of a pair of bearing-brackets, each of which comprises a supporting-plate and a suspension and bearing arm, said arm provided with a substantially C-shaped opening forming thereby a pair of pockets, a pair of retaining-lugs, a seat and a bearing-surface, a vertically-adjustable shaft extending through said openings, and when moved to its upper position adapted to engage in said upper pockets and be suspended by said arm, and said arm adapted to form a bearing for the said shaft when the latter is moved in said lower pockets, and wheels carried by the said shaft.

6. An attachment for wheelbarrows, trucks or the like, consisting of a pair of bearing-brackets, each of which comprises a supporting-plate and a suspension and bearing arm, said arm provided with a substantially C-shaped opening forming thereby a pair of pockets, a pair of retaining-lugs, a seat and a bearing-surface, said pockets being substantially in vertical alinement, a vertically-adjustable shaft extending through said openings, and when moved to its upper position adapted to engage in said upper pockets and be suspended by said arm, and said arm adapted to form a bearing for the said shaft when the latter is moved in said lower pockets, and wheels carried by the said shaft.

7. An attachment for wheelbarrows, trucks or the like, consisting of a pair of bearing-brackets each of which is provided with a substantially C-shaped opening to form an upper and a lower pocket, a vertically-adjustable shaft extending through the said openings, said shaft when moved to its upper position adapted to engage in the said upper pockets and be suspended by said bracket, and said bracket adapted to form a bearing for the said shaft when the latter is moved into the said lower pockets, and a pair of wheels suitably connected to said shaft.

8. An attachment for wheelbarrows, trucks or the like, consisting of a pair of stationary bearing-brackets each of which is provided with a supporting-plate having openings to receive holdfast devices and further provided with a combined suspension and bearing arm integral with the said plate, a vertically-adjustable shaft extending through the said arms, said arms adapted to suspend the said shaft when elevated to its upper position and adapted to form a bearing for the said shaft when the latter is moved to its lower position, and a pair of wheels suitably connected to the said shaft.

9. An attachment for wheelbarrows, trucks or the like, consisting of a pair of bearing-brackets, each of which comprises a supporting-plate and a suspension and bearing arm, said arm provided with a substantially C-shaped opening forming thereby a pair of pockets, a pair of retaining-lugs, a pair of seats and a bearing-surface, said pockets being substantially in vertical alinement, a vertically-adjustable shaft extending through said openings, and when moved to its upper position adapted to engage in said upper pockets and be suspended by said arm, and said arm adapted to form a bearing for the said shaft when the latter is moved in said lower pockets, and wheels carried by the said shaft.

10. An attachment for wheelbarrows, trucks or the like, consisting of a pair of bearing-brackets, each of which comprises a supporting-plate and a suspension and bearing arm, said arm provided with a substantially C-shaped opening forming thereby a pair of pockets, a pair of retaining-lugs, a pair of seats and a bearing-surface, a vertically-adjustable shaft extending through said openings, and when moved to its upper position adapted to engage in said upper pockets and be suspended by said arm, and said arm adapted to form a bearing for the said shaft when the latter is moved in said lower pockets, and wheels carried by the said shaft.

In testimony whereof I have hereunto set my hand in presence of two subscribing witnesses.

EDWIN M. CUMMINS.

Witnesses:
C. W. TAYLOR,
C. W. BLAGG.